July 5, 1927.
N. COSTANZO
VEHICLE TIRE
Filed Oct. 15, 1926
1,634,253
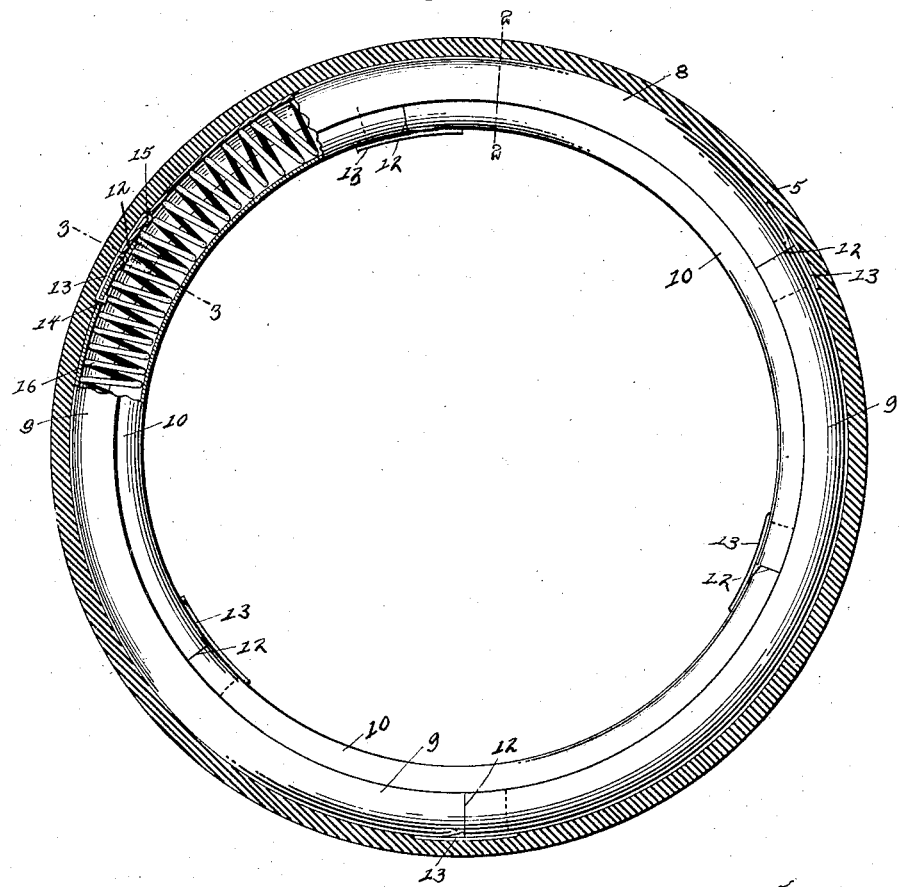
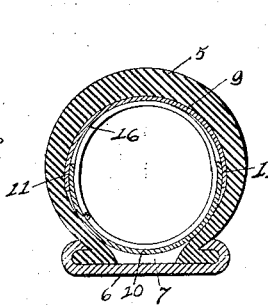
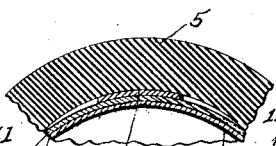
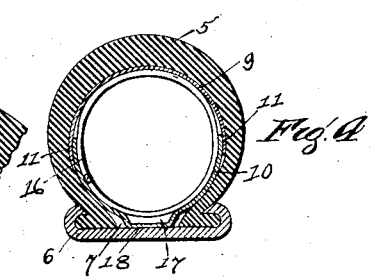
Inventor
Nicola Costanzo
By Ralph Burch
Attorney Patented July 5, 1927.

1,634,253

UNITED STATES PATENT OFFICE.

NICOLA COSTANZO, OF NEW YORK, N. Y.

VEHICLE TIRE.

Application filed October 15, 1926. Serial No. 141,731.

My invention relates to improvements in vehicle tires and more particularly to a metallic spring inner tube for use with the conventional tire shoe or casing.

It is an object of the invention to provide an inner tube composed of a plurality of inner and outer sections, the latter being relatively movable with respect to the former and a coil spring adapted to absorb the shocks and distortions to which the tube is subjected when in use.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1, is a side elevation, partly in section of my invention, with the tire shoe in section, Fig. 2, is a cross section taken on lines 2—2 of Fig. 1, Fig. 3, is a fragmentary section taken on lines 3—3 of Fig. 1, and, Fig. 4, is a cross section of a modified form of the invention.

In the drawing, wherein for the purpose of illustration, I have shown a preferred embodiment of my invention, the numeral 5, denotes a conventional type of tire shoe or casing adapted for mounting on the usual rim 6 and having the usual opening 7, for insertion of an inner tube.

Referring more particularly to my invention, the numeral 8 denotes generally, a metallic tube, preferably constructed of aluminum and adapted to fit within the tire shoe. The tube is composed of a plurality of arcuate outer and inner sections 9 and 10, the longitudinal edges of the outer sections being disposed in overlapping relation with respect to the edges of the inner sections, as at 11, so as to permit movement of the outer section with respect to the inner section, the outer section being capable of moving into an eccentric position relative to the inner section.

The adjoining ends of the outer sections and adjoining ends of the inner sections are telescopically fitted together as at 12, being secured together by metal plates 13 extending across the jointure of the sections and having their ends clinched through openings 14, as at 15. In assembling it will be observed that the joints of the inner sections are disposed intermediate the outer sections, as clearly shown in Fig. 1.

A coil spring 16, constructed of spring wire of proper gage is disposed within the tube 8, the convolutions of the spring bearing against the outer and inner sections, normally holding them in proper relation with respect to each other.

A modified form of the invention is shown in Fig. 4, consisting in forming a longitudinal depression 17 in the center of the inner sections of the tube, providing a rib 18 on the bottom which is normally disposed intermediate the opening 7 of the tire shoe and holds the inner sections against undue lateral movement.

In use, the tube is inserted in the usual type of tire shoe and the shoe is then placed upon the rim of the vehicle wheel. The spring within the tube has sufficient tension to properly position the sections of the tube, so the tire will support the load of the vehicle, and at the same time have a maximum resiliency to absorb the shocks and vibrations imparted to the tire. A tube of this construction will possess all the ordinary qualities of a pneumatic tire and will not be subject to punctures, blow-outs and rim cuts and does not depend upon inflation to maintain the tire in operative condition.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. In a vehicle tire, the combination of a casing, an inner tube comprising inner and outer arcuate sections having their marginal edges disposed in overlapping relation, each section being divided into a plurality of parts having their abutting ends telescopically fitted together, a band extending across each jointure of the parts having its ends clinched through openings in each two adjacent parts of the sections, and a circumferentially extending coil spring disposed within said tube having its convolutions bearing against the inner and outer sections.

2. In a vehicle tire, the combination of a casing, an inner tube comprising inner and outer arcuate sections having their marginal edges disposed in overlapping relation, each section being divided into a plurality of parts having their abutting ends telescopically fitted together, a band extending across each jointure of the parts having its ends clinched through openings in each two adjacent parts of the sections, a circumferentially extending coil spring disposed within said tube having its convolutions bearing against the inner and outer sections, and a longitudinally extending rib pressed from the bottom of said inner section.

In testimony whereof I affix my signature.

NICOLA COSTANZO.